(12) United States Patent
Shin et al.

(10) Patent No.: US 11,943,454 B2
(45) Date of Patent: *Mar. 26, 2024

(54) IMAGE PROCESSING APPARATUS AND OPERATION METHOD FOR LEARNING PARAMETERS BASED ON MACHINE LEARNING

(71) Applicant: PIXTREE Co., Ltd., Seoul (KR)

(72) Inventors: Jaeseob Shin, Seoul (KR); Sungul Ryoo, Seoul (KR); Sehoon Son, Seoul (KR); Hyeongduck Kim, Gyeonggi-do (KR); Hyosong Kim, Seoul (KR)

(73) Assignee: PIXTREE CO., LTD. (KR)

( * ) Notice: Subject to any disclaimer, the term of this patent is extended or adjusted under 35 U.S.C. 154(b) by 368 days.

This patent is subject to a terminal disclaimer.

(21) Appl. No.: 17/413,945

(22) PCT Filed: Nov. 29, 2019

(86) PCT No.: PCT/KR2019/016672
§ 371 (c)(1),
(2) Date: Jul. 23, 2021

(87) PCT Pub. No.: WO2020/122478
PCT Pub. Date: Jun. 18, 2020

(65) Prior Publication Data
US 2022/0086462 A1    Mar. 17, 2022

(30) Foreign Application Priority Data
Dec. 13, 2018  (KR) ........................ 10-2018-0161365

(51) Int. Cl.
*H04N 19/172*    (2014.01)
*G06N 20/00*    (2019.01)
(Continued)

(52) U.S. Cl.
CPC .......... *H04N 19/172* (2014.11); *G06N 20/00* (2019.01); *H04N 19/91* (2014.11); *H04N 21/236* (2013.01)

(58) Field of Classification Search
None
See application file for complete search history.

(56) References Cited

U.S. PATENT DOCUMENTS

2019/0230354 A1*  7/2019  Kim ..................... H04N 19/159
2021/0021820 A1*  1/2021  Ikai ........................ G06N 3/045

FOREIGN PATENT DOCUMENTS

KR       20180001428 A    1/2018
KR       20180052651 A    5/2018
(Continued)

*Primary Examiner* — Stuart D Bennett
(74) *Attorney, Agent, or Firm* — Renaissance IP Law Group LLP

(57) ABSTRACT

The present disclosure relates to a technical idea of compensating for degradation of an image quality during compression in an encoding process by using a parameter trained based on machine learning. An image processing apparatus includes an input frame buffer configured to store an input original frame, an encoding processor configured to encode the stored original frame, an output stream buffer configured to output the encoded original frame as an output stream for multiplexing, a multiplexing processor configured to control the output stream to be multiplexed and transmitted, a local decoding processor configured to output a restored stream by receiving the output stream from the output stream buffer and decoding the output stream, a restored frame buffer configured to store the output restored stream, and a machine learning processor configured to collect the input original frame and the output restored frame, output a parameter based on machine learning of the collected original frame and the collected restored frame, and control the multiplex- (Continued)

ing processor to transmit the output parameter to a decoding side.

22 Claims, 10 Drawing Sheets

(51) Int. Cl.
*H04N 19/91* (2014.01)
*H04N 21/236* (2011.01)

(56) References Cited

FOREIGN PATENT DOCUMENTS

| | | |
|---|---|---|
| KR | 20180100976 A | 9/2018 |
| KR | 20180108288 A | 10/2018 |
| KR | 20180119753 A | 11/2018 |

* cited by examiner

IMAGE PROCESSING APPARATUS AND OPERATION METHOD FOR LEARNING PARAMETERS BASED ON MACHINE LEARNING

TECHNICAL FIELD

The present disclosure relates to a technical idea of compensating for image quality degradation that occurs during encoding by using a parameter trained based on machine learning performed outside a codec.

BACKGROUND ART

When a video, an image, or sound data is generated, encoding and compressing data to reduce the amount of original data is called encoding.

Encoding may be performed in the process of transmitting an image to a remote location, and the remote location decodes and restores the encoded data.

During encoding, information loss occurs due to compression in most cases. Accordingly, a decoded image has a quality lower than that of an original frame in view of the loss.

In order to prevent loss-incurred quality degradation, various methods of decoding an image to the level of an original image are currently being proposed.

Nonetheless, a technique of decoding an image to the level of a quality close to that of an original frame without significantly increasing an image encoding or decoding time is yet to be developed. Along with the recent increase of the resolution of TVs and distribution of high-quality content, the demands for reduction of quality deterioration involved in encoding and decoding are also increasing.

Prior Art Literature (Patent Document 0001) Korean Patent No. 10-1803471, "Deep learning system using image patterning based on convolutional neural network, and image learning method using the same"

(Patent Document 0002) Korean Patent No. 10-1906796, "Deep learning-based image analysis apparatus and image analysis method"

(Patent Document 0003) Korean Patent Laid-Open No. 10-2017-0070715, "Deep learning-based image processing apparatus and method, and learning apparatus"

DETAILED DESCRIPTION

Technical Problem

An aspect of the present disclosure is to compensate for deterioration of an image quality that occurs during encoding by using a parameter trained based on machine learning performed outside a codec.

Another aspect of the present disclosure is to train a parameter through machine learning performed outside a codex during encoding and decoding.

Technical Solution

According to an embodiment, an image processing apparatus includes an input frame buffer configured to store an input original frame, an encoding processor configured to encode the stored original frame, an output stream buffer configured to output the encoded original frame as an output stream for multiplexing, a multiplexing processor configured to control the output stream to be multiplexed and transmitted, a local decoding processor configured to output a restored stream by receiving the output stream from the output stream buffer and decoding the output stream, a restored frame buffer configured to store the output restored stream, and a machine learning processor configured to collect the input original frame and the output restored frame, output a parameter based on machine learning of the collected original frame and the collected restored frame, and control the multiplexing processor to transmit the output parameter to a decoding side.

According to an embodiment, the multiplexing processor may process the output parameter and the multiplexed output stream to be transmitted in association with each other to the decoding side.

According to an embodiment, the machine learning processor may include a machine learning inferer configured to subject the output restored frame to machine learning inference by initializing the output restored stream with a pre-trained parameter, an error backpropagator configured to calculate an error value by comparing the restored frame subjected to machine learning inference with the input original frame, request the machine learning inferer to update the pre-trained parameter through machine learning inference again by backpropagating the calculated error value according to a predetermined criterion, and output the updated parameter, and a parameter transmitter configured to transmit the output parameter to the multiplexing processor.

According to an embodiment, the parameter transmitter may encode a difference value between the pre-trained parameter and the updated and output parameter, and transmit the encoded difference value to the multiplexing processor.

According to an embodiment, the machine learning processor may further include a training sub-image divider configured to divide at least one of the restored frame or the original frame into a plurality of sub-images. The machine learning inferer may subject a plurality of sub-images divided from the restored frame to machine learning inference by initializing the plurality of sub-images divided from the restored frame with the pre-trained parameter, and the error backpropagator may calculate an error value by comparing a plurality of sub-images divided from the original frame with the plurality of sub-images divided from the restored frame.

According to an embodiment, an image processing apparatus includes a demultiplexing processor configured to extract an input stream and parameter information by demultiplexing an input stream received from an encoding device, an input stream buffer configured to store the extracted input stream, a decoding processor configured to generate a restored frame by decoding the stored input stream, a restored frame buffer configured to store the generated restored frame, a machine learning image quality improvement processor configured to generate an output frame with an improved image quality by applying the extracted parameter information to the restored frame, and an output frame buffer configured to store the generated output frame. The encoding device updates a parameter by machine learning based on an error between an input original frame and a frame restored from the original frame through a local decoder, and transmit the parameter information corresponding to the updated parameter together with the input stream.

According to an embodiment, the parameter information may include information about a difference between a pre-trained parameter and the updated parameter.

According to an embodiment, the image processing apparatus may further include a frame selector configured to select one frame by comparing the generated restored frame with the output frame with the improved image quality for the restored frame, and control the selected frame to be stored in the output frame buffer.

According to an embodiment, the machine learning image quality improvement processor may include a parameter information decoding processor configured to extract a parameter by decoding the parameter information, a parameter decider configured to update the parameter in consideration of a difference between the extracted parameter and the pre-trained parameter, and a machine learning inferer configured to improve an image quality of the restored frame by applying the updated parameter to the restored frame stored in the restored frame buffer.

According to an embodiment, a method of operating an image processing apparatus includes storing an input original frame by an input frame buffer, encoding the stored original frame by an encoding processor, outputting the encoded original frame as an output stream for multiplexing by an output stream buffer, controlling the output stream to be multiplexed and transmitted by a multiplexing processor, outputting a restored stream by receiving the output stream from the output stream buffer and decoding the output stream by a local decoding processor, storing the output restored stream by a restored frame buffer, and collecting the input original frame and the output restored frame, outputting a parameter based on machine learning of the collected original frame and the collected restored frame, and controlling the multiplexing processor to transmit the output parameter to a decoding side by a machine learning processor.

According to an embodiment, the controlling of the output stream to be multiplexed and transmitted may include processing the output parameter and the multiplexed output stream to be transmitted in association with each other to the decoding side.

According to an embodiment, the controlling of the multiplexing processor to transmit the output parameter to a decoding side may include subjecting the output restored frame to machine learning inference by initializing the output restored stream with a pre-trained parameter, calculating an error value by comparing the restored frame subjected to machine learning inference with the input original frame, requesting update of the pre-trained parameter through machine learning inference again by back-propagating the calculated error value according to a pre-determined criterion, outputting the updated parameter, and transmitting the output parameter to the multiplexing processor.

According to an embodiment, the transmission of the output parameter to the multiplexing processor may include encoding a difference value between the pre-trained parameter and the updated and output parameter and transmitting the encoded difference value to the multiplexing processor.

According to an embodiment, a method of operating an image processing apparatus includes extracting an input stream and parameter information by demultiplexing an input stream received from an encoding device by a demultiplexing processor, storing the extracted input stream by an input stream buffer, generating a restored frame by decoding the stored input stream by a decoding processor, storing the generated restored frame by a restored frame buffer, generating an output frame with an improved image quality by applying the extracted parameter information to the restored frame by a machine learning image quality improvement processor, and storing the generated output frame by an output frame buffer. The encoding device updates a parameter by machine learning based on an error between an input original frame and a frame restored from the original frame through a local decoder, and transmits the parameter information corresponding to the updated parameter together with the input stream.

According to an embodiment, the method may further include selecting one frame by comparing the generated restored frame with the output frame with the improved image quality for the restored frame, and controlling the selected frame to be stored in the output frame buffer.

According to an embodiment, the generation of an output frame with an improved image quality may include extracting a parameter by decoding the parameter information, updating the parameter in consideration of a difference between the extracted parameter and the pre-trained parameter, and processing the restored frame to have the improved image quality by applying the updated parameter to the stored restored frame.

Advantageous Effects

According to an embodiment, image quality deterioration that occurs during encoding may be compensated for by using a parameter trained based on machine learning.

According to an embodiment, a parameter may be trained through machine learning during encoding and decoding.

BEST MODE

Figure 1:
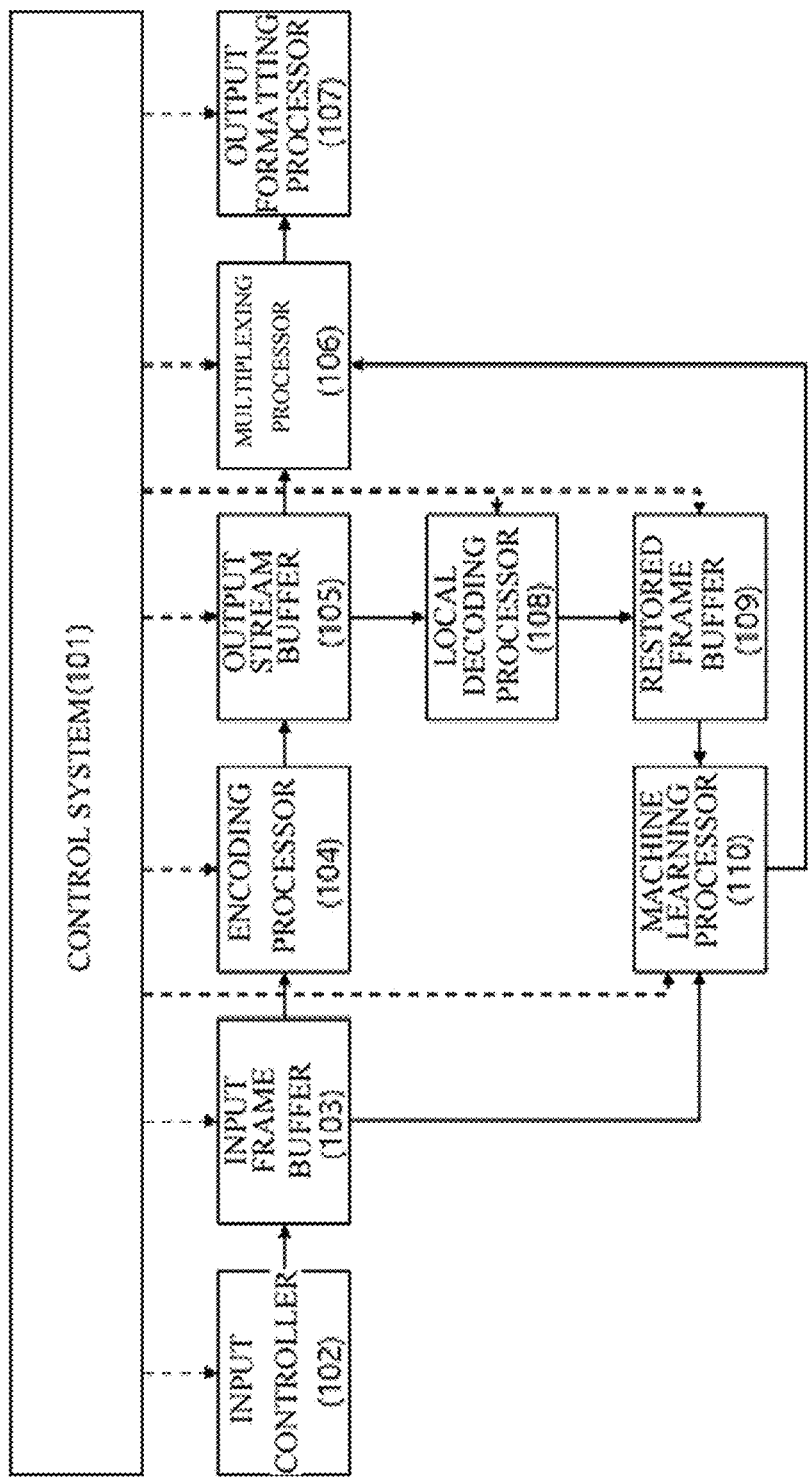
FIG. 1 is a block diagram illustrating an encoding system in an image processing apparatus according to an embodiment.

Specific structural or functional descriptions of the embodiments according to the concept of the present disclosure are only exemplified for the purpose of explaining the embodiments according to the concept of the present disclosure, and embodiments according to the concept of the present disclosure may be implemented in various forms and are not limited to the embodiments described herein.

Since the embodiments according to the concept of the present disclosure may have various changes and may have various forms, the embodiments will be illustrated in the drawings and described in detail herein. However, the embodiments and terms used herein are not intended to limit the technical scope of the disclosure, and it is to be understood that the present disclosure covers various modifications, equivalents, and/or alternatives.

The term as used in the disclosure, "1st", "2nd", "first" or "second' may be used for the names of various components irrespective of sequence and/or importance, not limiting the components. These expressions are used to distinguish one component from another component. For example, a first component may be referred to as a second component and vice versa without departing the scope of the disclosure.

When it is said that a component is "coupled with/to" or "connected to" another component, it should be understood that the one component is connected to the other component directly or through any other component. On the other hand, when it is said that a component is "directly connected to" or "directly coupled to" another component, it may be understood that there is no other component between the components. Expressions describing the relationship between components, for example, "between" and "between" or "directly adjacent to" should be interpreted similarly.

The terms as used in the disclosure are provided to describe merely specific embodiments, not intended to limit the scope of other embodiments. It is to be understood that singular forms include plural referents unless the context clearly dictates otherwise. In the disclosure, the term "have", "may have", "include", or "may include" signifies the presence of a corresponding feature, number, step, operation, component, or part, not excluding the presence of one or more other features, numbers, steps, operations, components, or parts.

The terms including technical or scientific terms used in the disclosure may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings.

Embodiments will be described in detail with reference to the accompanying drawings. However, the scope of the patent application is not restricted or limited by these embodiments. With regard to the drawings, like reference numerals denote the same components.

While the concept of the present disclosure is described based on conventional machine learning, this may be interpreted as various learning techniques such as deep learning or convolutional neural networks.

FIG. 1 is a block diagram illustrating an encoding system in an image processing apparatus according to an embodiment.

An image processing apparatus 100 according to an embodiment may compensate for image quality degradation during encoding by using a parameter trained based on machine learning. Further, the parameter may be trained through machine learning during encoding and decoding.

For this purpose, the image processing apparatus 100 according to an embodiment may include at least some of an input controller 102, an input frame buffer 103, an encoding processor 104, an output stream buffer 105, a multiplexing processor 106, a local decoding processor 108, a restored frame buffer 109, and a machine learning processor 110, which operate under the control of a control system 101.

The input controller 102 according to an embodiment may control an input original frame to be stored in the input frame buffer 103.

The encoding processor 104 may encode the stored original frame. During the encoding, general known encoding algorithms may be applied.

The output stream buffer 105 may store the encoded original frame and provide the encoded original frame to the multiplexing processor 106, for multiplexing prior to output.

The multiplexing processor 106 may multiplex encoded audio information, image information, and meta information, and an output formatting processor 107 may process the multiplexed information into a format suitable for output.

The encoded original frame stored in the output stream buffer 105 may be decoded by the local decoding processor 108 which is located locally. The local decoding processor 108 may also function as a local decoder located on an encoding side in order to refer to an adjacent frame during frame encoding.

The local decoding processor 108 may generate a restored frame by decoding the original frame stored in the output stream buffer 105 after the encoding.

The restored frame buffer 109 may store the generated restored frame and provide the restored frame as an input of the machine learning processor 110, when needed.

The machine learning processor 110 according to an embodiment may collect the original frame stored in the input frame buffer 103 and the restored frame stored in the restored frame buffer 109.

Further, the machine learning processor 110 may perform machine learning by using the collected original frame and restored frame, generate a training parameter with which to restore the frame to the level of the original frame during decoding by using the machine learning result, and provide the training parameter to the multiplexing processor 106.

For this purpose, the machine learning processor 110 may output an updated parameter based on machine learning using the collected original frame and restored frame, and control the multiplexing processor 106 to transmit the output parameter to a decoding side. In this process, the multiplexing processor 106 may request the output formatting processor 107 to transmit the output parameter and the multiplexed output stream in association with each other to the decoding side.

More specifically, the machine learning processor 110 may calculate an error by comparing the restored frame with the input original frame and repeat machine learning inference based on the calculated error according to a predetermined criterion in order to output the updated parameter.

The operation of the machine learning processor 110 will be described below in greater detail with reference to FIG. 2.

Figure 2:
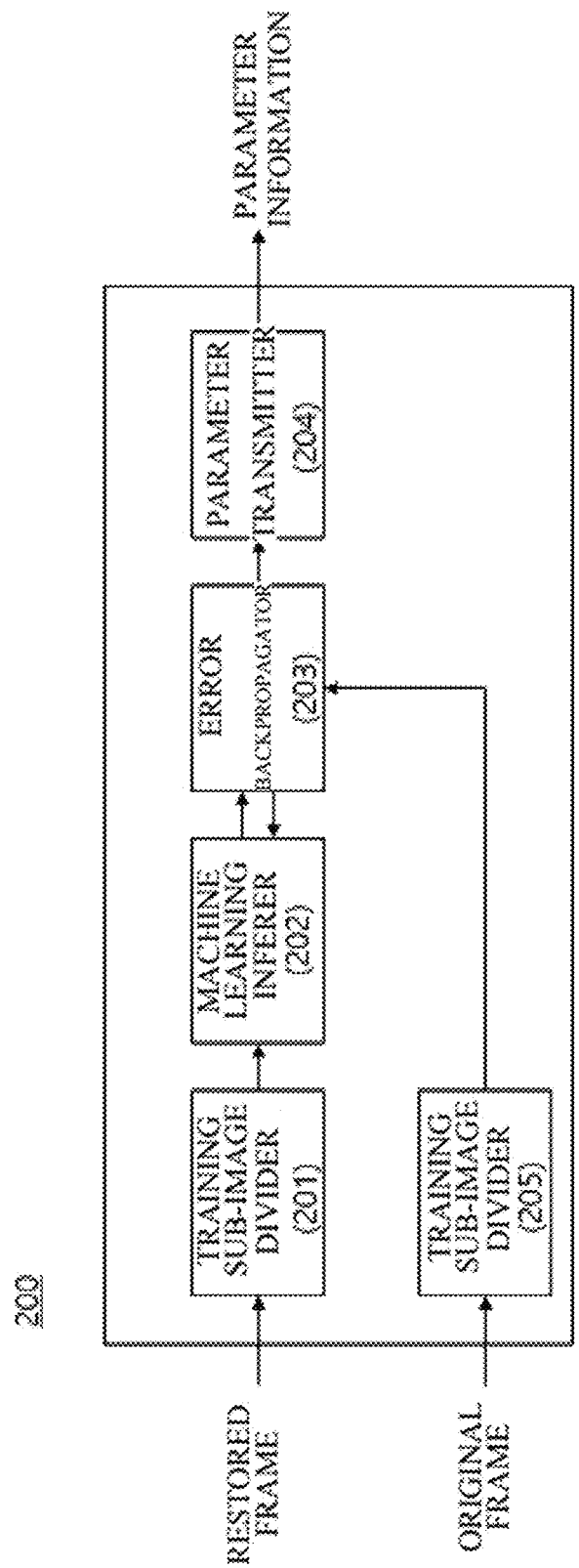
FIG. 2 is a detailed block diagram illustrating a machine learning processor according to an embodiment.

FIG. 2 is a detailed block diagram illustrating the machine learning processor 200 according to an embodiment.

The machine learning processor 200 according to an embodiment may include a machine learning inferer 202, an error backpropagator 203, and a parameter transmitter 204.

Further, the machine learning processor 200 according to an embodiment may selectively include a training sub-image divider 201 capable of dividing an input restored frame into a plurality of parts in consideration of the size of the input restored frame.

The machine learning processor 200 according to an embodiment should also collect the original frame to be compared with the restored frame. Similarly, since the original frame may be divided into a plurality of parts in consideration of the size of the original frame, the machine learning processor 200 may optionally include the training sub-image divider 205 capable of dividing a frame into a plurality of parts.

The machine learning inferer 202 according to an embodiment may initialize the output restored frame with a pre-trained parameter, for machine learning inference.

The error backpropagator 203 according to an embodiment may calculate an error by comparing the machine learning-inferred restored frame with the input original frame. Further, the error backpropagator 203 may request the machine learning inferer 202 to perform machine learning inference again by backpropagating the calculated error according to a predetermined criterion to the machine learning inferer 202. When machine learning is repeated by backpropagation in this manner, the pre-trained parameter may be updated. The error backpropagator 203 may output the updated parameter the updated parameter as parameter information to the multiplexing processor through the parameter transmitter.

In general machine learning, an error of the error backpropagator is an "error in training data", which may include a regularization term designed to increase generalization performance or an additional term designed to reflect a designer's intention. Further, the error backpropagator 203 according to an embodiment may repeatedly perform error backpropagation regardless of the magnitude of the calculated error.

In addition, an "error for determining the ending time of training" is an "error of verification data", for which MSE, PSNR, SSIM, and so on for measuring final performance may be used.

For example, when training data is transmitted in units of a group of pictures (GOP), some frames used for training within a GOP may be "training data", and the remaining frames unused for the training may be "verification data". This is merely an embodiment, and an application example using all frames in a GOP as training data is also possible.

When collecting the restored frame, the machine learning inferer 202 according to an embodiment may initialize a training parameter for the restored frame to a predetermined parameter.

The predetermined parameter may also be updated by machine learning inference requested by the error backpropagator 203.

The parameter transmitter 204 according to an embodiment may encode only the difference between the pre-trained parameter and the updated and then output parameter, and output the encoded difference as parameter information.

In some cases, the amount of data in the parameter is too large to be ignored. Furthermore, the decoding side has the same pre-trained parameter as the encoding side. In this regard, therefore, only the updated degree of the parameter may be transmitted to the decoding side.

Figure 3:
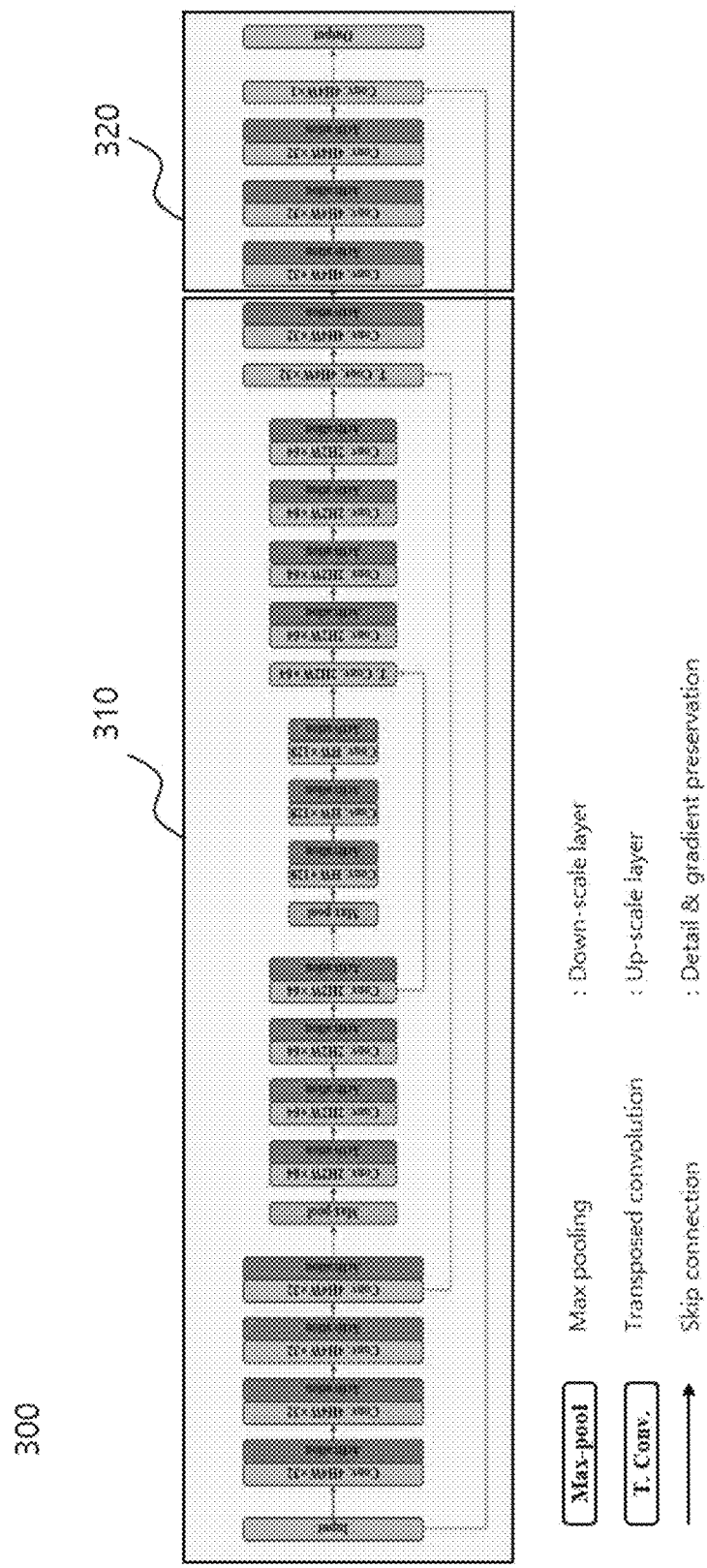
FIG. 3 is a diagram illustrating an embodiment of training a parameter through machine learning.

FIG. 3 is a diagram illustrating an embodiment 300 of training a parameter through machine learning.

In the embodiment 300 of FIG. 3, an original frame and a restored frame are compared by applying a filter kernel value initialized through a layer block 310 and a second layer block 320, an error is calculated according to the comparison result, and a parameter is updated by backpropagating the error.

The embodiment 300 of FIG. 3 is a machine learning technique corresponding to an application example using a deep neural network. That is, the embodiment 300 of FIG. 3 may reduce a learning computation load by a fine-tuning process in which only some layer block 320 located at the rear end is updated in a pre-trained parameter-based initialized state, instead of updating entire parameters.

Referring to the embodiment of FIG. 3, a hierarchical structure may be fixed, and specific parameters in the hierarchical structure may be set as a result of training. That is, each coefficient in the hierarchical structure is a parameter, which may be interpreted as information required for restoring information about a distorted image through image encoding and decoding.

Therefore, a parameter of a layered structure may be output at a specific position like metadata, when a stream is generated.

The decoding side may receive and decode the stream from the encoding side and restore the stream into an image close to the original image by driving a neural network module using the parameter received from the encoder.

Compression-incurred loss may be compensated for by using an updated parameter. In the case of general machine learning-based processing, real-time processing is difficult during decoding as well as encoding.

As noted from the embodiment 300 of FIG. 3, a parameter may be trained through machine learning. The image processing apparatus according to the present disclosure may train the parameter through iterative machine learning between the machine learning inference module and the error backpropagation module in the encoding process 310.

Referring to the embodiment 300 of FIG. 3, for encoding, a parameter may be transmitted on a frame basis, on a GOP basis, a scene cut basis, on a block basis, or on an entire image sequence basis (e.g., a parameter for Harry Potter 3).

The present disclosure corresponds to the concept of transmitting a result outside a codec as a parameter, and each of unit blocks sequentially concatenated in the embodiment 300 may be interpreted as a separate layer distinguished for machine learning.

For machine learning, there are kernel coefficients that may be changed by training, not a predetermined kernel, and a filter size such as 3×3 or 5×5 may be predetermined by a network design through the kernel coefficients.

In the embodiment 300 of FIG. 3, a feature may be extracted through a convolution kernel based on machine learning. The convolution kernel may be interpreted as a kernel in which a previous layer may be mapped to a next layer, and as an input frame proceeds through convolution, a parameter may be trained so that transformed mapping may be mapped to an ideal output.

In the embodiment 300 of FIG. 3, the reason for reducing the size from ×32 to ×64 and ×128 is to analyze an image by extracting features from images of various scales because there are various features extractable at each image scale. Further, the image may be scaled down to ½ horizontal and ½ vertical through max-pooling in a middle process. In this process, features for 9 mapping positions may be detected by reducing the size of a frame once. Since spatial information is lost during encoding, original information may be retrieved to compensate for the lost information.

In the embodiment 300 of FIG. 3, a 3×3 kernel is applied as a structure for reducing image artifacts, and thus 32 3×3 kernels may be trained in the first layer. In addition, as 32 parameters are trained once again in the 3×3 kernel, parameters may be trained by applying the 3×3 kernel to all 32 maps in the second layer.

On the assumption that the first input frame has only one y channel, there may be only one image, and a feature map may be created by applying a 3×3 kernel to the image. 32 feature maps may be generated by applying this process a total of 32 times.

That is, 32 feature maps are finally to be created in the first layer 310, and a feature map may be created by applying a 3×3 kernel to all 32 channels.

In the embodiment 300 of FIG. 3, the first layer 310 and the second layer 320 are compared by applying a randomly initialized filter kernel value to each of the first layer 310 and the second layer 320, an error is calculated based on the comparison result, and a parameter is updated by backpropagating the gradient of the error.

A computation volume may be further reduced by applying a predetermined filter kernel value, and a lot of error propagation is required to generate a desired parameter. That is, use of a predetermined parameter may reduce a time required for training and lead to a much more sophisticated result.

Now, a description will be given of an application example of improving an image quality through machine learning performed outside a codec, with reference to FIGS. 4 and 5.

Figure 4:
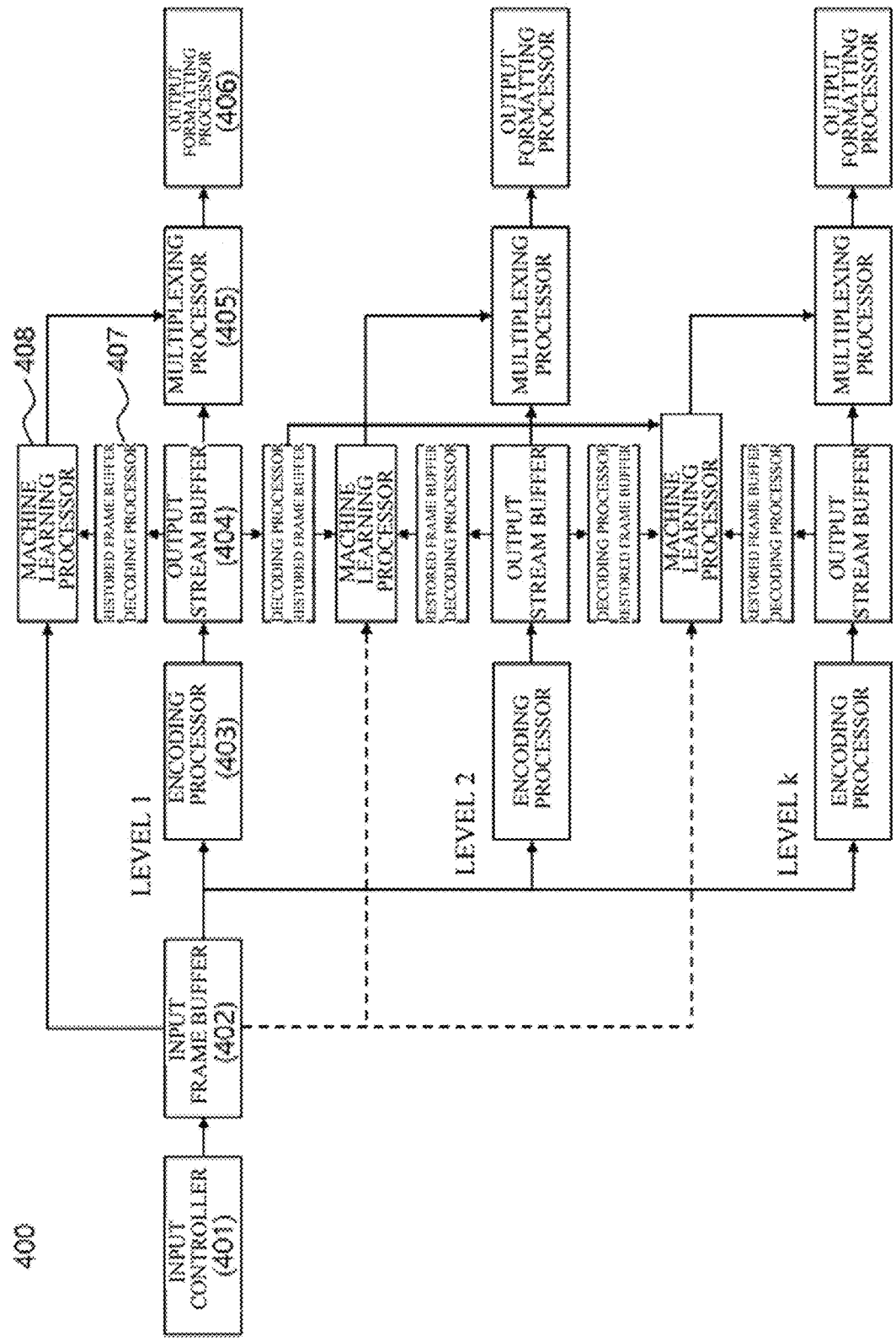
FIGS. 4 and 5 are block diagrams illustrating an application example of improving an image quality through machine learning performed outside a codec.

FIG. 4 is a block diagram illustrating an embodiment of using frames at different levels in an image processing apparatus according to an embodiment.

An image processing apparatus 400 according to an embodiment encodes original frames input at different levels, receives original frames and restored frames from adjacent levels, and performs machine learning.

For this purpose, except for a structure for receiving frames from adjacent levels, an input controller 401, an input frame buffer 402, an encoding processor 403, an output stream buffer 404, a multiplexing processor 405, and an output formatting processor 406 operate in the same manner as their counterparts illustrated in FIG. 1.

However, the image processing apparatus 400 according to an embodiment includes a decoding processor that collects and decodes restored frames from output stream buffers at different adjacent different level, a processing block 407 as a set of restored frame buffers that store decoded restored frames, and a machine learning processor 408 for generating and outputting filter parameters by machine learning of a restored frame at a level adjacent to a stored restored frame.

The machine learning processor 408 may provide machine-learned parameter information for improving lower-layer restored frame information to the level of higher-layer restored frame information through the hierarchical structure.

The processing block 407 and the machine learning processor 408 may be disposed between output stream buffers at each level, collect information from adjacent levels, and output a filter parameter as an input to the multiplexing processor.

That is, a machine-learned parameter that improves a restored frame for an output stream to the level of input original frame information.

Since various features are extractable at each scale of an image, the effect of improving an image quality may be enhanced, when an image is analyzed by extracting features from images of various scales.

The machine learning processor 408 according to an embodiment may initialize an output restored frame by a pre-trained parameter, for deep learning inference. In addition, after an error is calculated by comparing the machine-learned restored frame with the input original frame, machine learning may be repeatedly performed according to a backpropagation request generated as a result of the error. As such, when machine learning is repeated by backpropagation, the pre-trained filter parameter may be updated. The updated filter parameter may be output and provided to the multiplexing processor 405.

The output formatting processor 406 according to an embodiment may encode only the difference between the pre-trained filter parameter and the filter parameter output after the update, and output the encoded difference as parameter information.

In some cases, the amount of data of the filter parameter is too large to be ignored. In addition, the decoding side has the same pre-trained parameter as the encoding side, and in consideration of this, real-time processing is possible by transmitting only the updated degree of the parameter to the decoding side.

Figure 5:
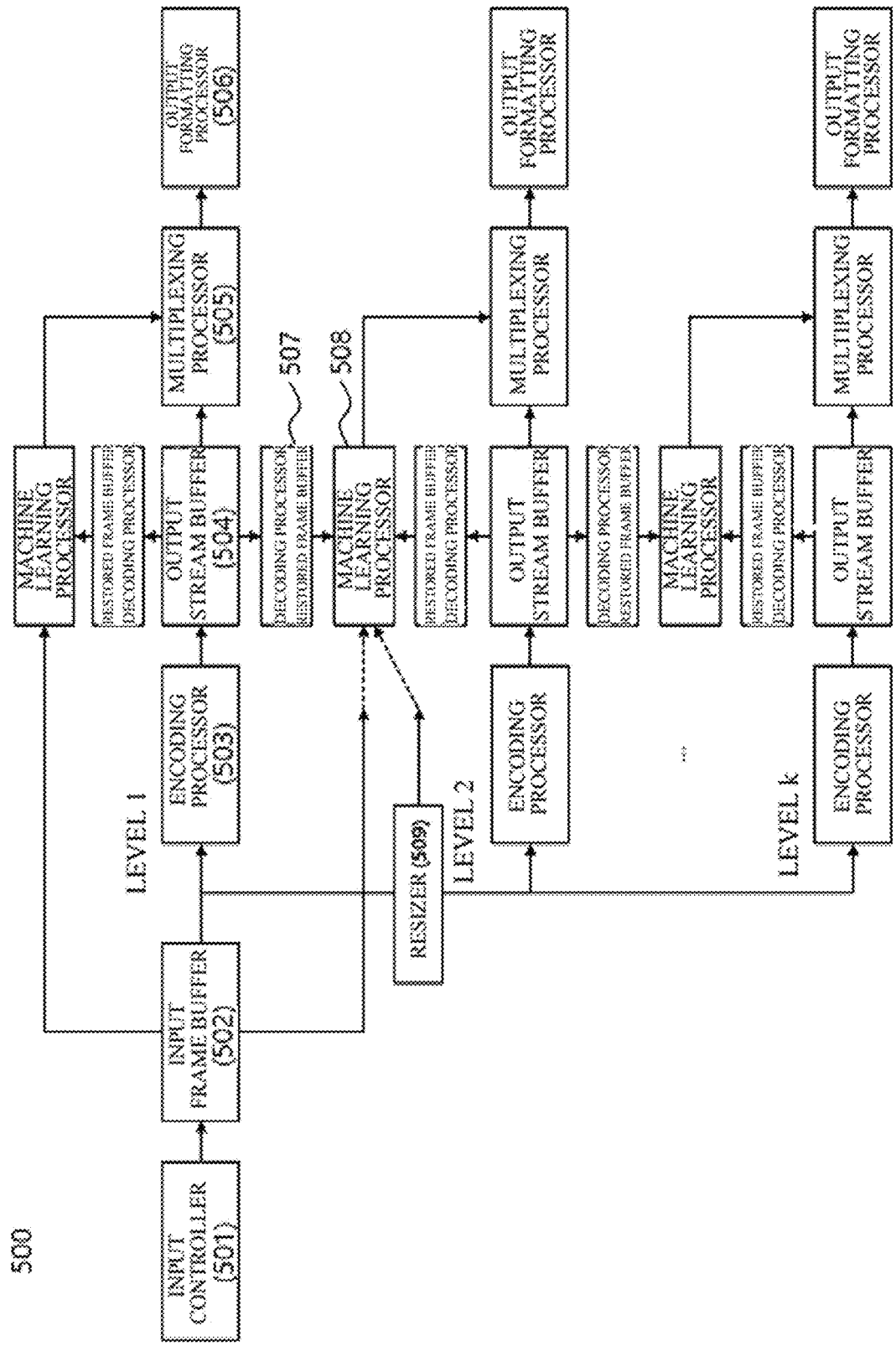

FIG. 5 is a diagram illustrating an embodiment in which a machine learning processor selectively receives an input frame with an adjusted size and performs machine learning.

An image processing apparatus 500 according to an embodiment may adjust the size of an input frame and provide the frame as an input of a machine learning processor 508.

Except for components for resizing an input frame, an input controller 501, an input frame buffer 502, an encoding processor 503, an output stream buffer 504, a multiplexing processor 505, and an output formatting processor 506 operate in the same manner as their counterparts of FIG. 3.

The machine learning processor 508 according to an embodiment may further collect an original frame from the input frame buffer 502. That is, the machine learning processor 508 may generate and output a filter parameter by machine learning of the collected original frame, a restored frame stored at an adjacent level, and a restored frame at the adjacent level.

For example, the machine learning processor 508 according to an embodiment may collect an original frame, specifically an original frame with a size adjusted through a resizer 509.

Accordingly, the machine learning processor 508 may generate and output a filter parameter by machine learning of the original frame of the size adjusted by the resizer 509, the stored restored frame, and the restored frame at the adjacent level.

Figure 6:
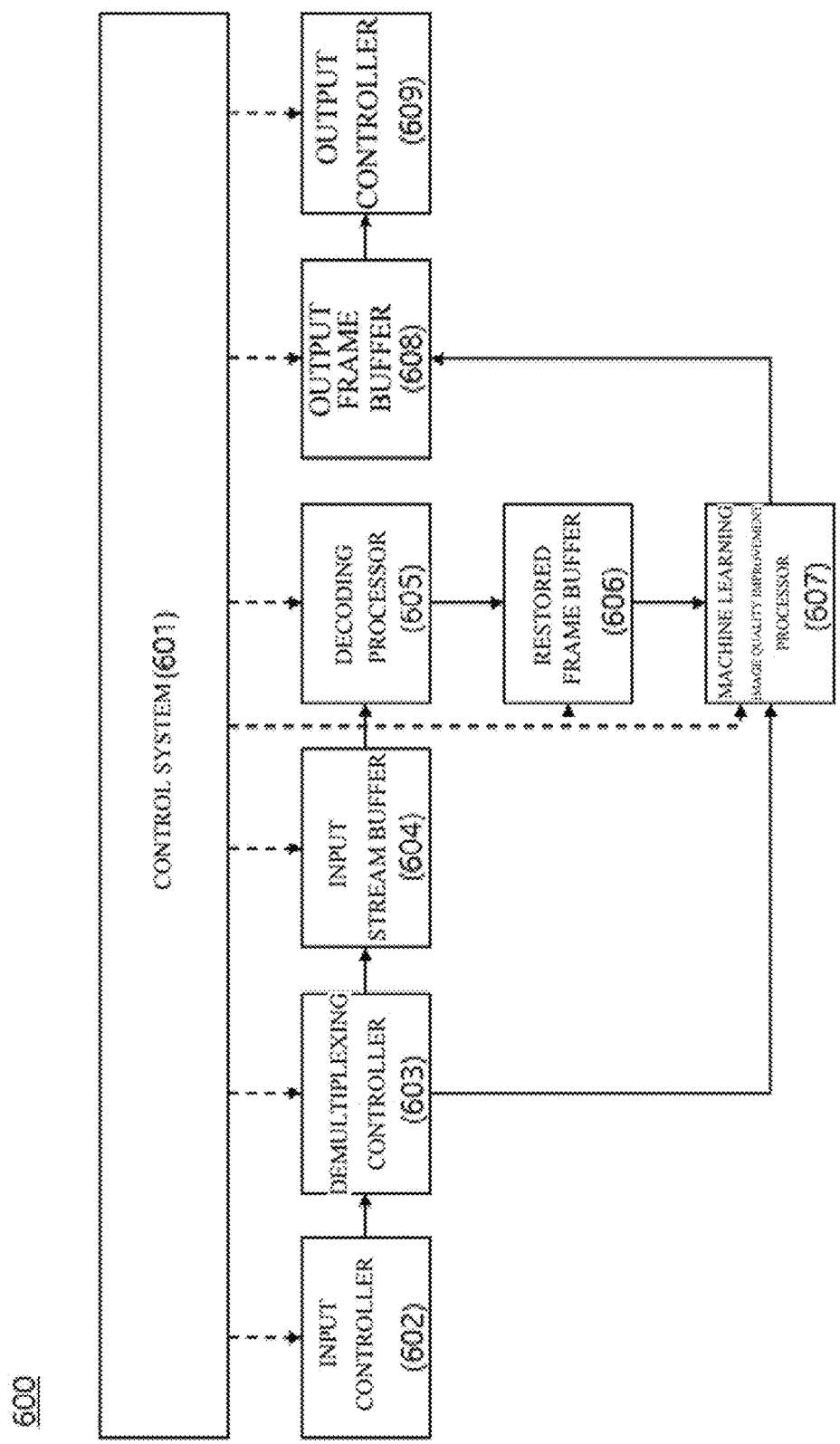
FIG. 6 is a block diagram illustrating a decoding system in an image processing apparatus according to an embodiment.

FIG. 6 is a diagram illustrating a decoding system in an image processing apparatus 600 according to an embodiment.

The image processing apparatus 600 according to an embodiment may compensate the quality of an image lost during encoding by a parameter trained based on machine learning, and train the parameter through machine learning during encoding and decoding.

For this purpose, the image processing apparatus 600 according to an embodiment may include at least some of an input controller 602, a demultiplexing processor 603, an input stream buffer 604, a decoding processor 605, a restored frame buffer 606, a machine learning image quality improvement processor 607, an output frame buffer 608, and an output controller 609, which operate under the control of a control system 601.

The input controller 602 according to an embodiment may control an input stream received from an encoder to be provided as an input of the demultiplexing processor 603.

The demultiplexing processor 603 may demultiplex the input stream received from the encoding device to extract the input stream and parameter information.

The parameter information may include an updated parameter or the difference between a pre-trained parameter and the updated parameter.

The input stream buffer 604 may store the extracted input stream.

Further, the decoding processor 605 may generate a restored frame by decoding the stored input stream, and store the restored frame in the restored frame buffer 606.

The machine learning image quality improvement processor 607 according to an embodiment may generate an output frame processed to an improved image quality by applying the extracted parameter information to the restored frame. The output frame buffer 608 may further store the output frame processed to the improved image quality and provide it to the output controller 609.

The encoding device has updated the parameter using machine learning based on the error between the input original frame and the frame restored from the original frame through the local decoder, and transmitted the parameter information corresponding to the updated parameter together with the input stream.

Accordingly, the machine learning image quality improvement processor 607 according to an embodiment may improve the image quality of the restored frame by updating the parameter in consideration of the difference between the extracted parameter and the pre-trained parameter.

A detailed operation of the machine learning image quality improvement processor 607 will be described in more detail below with reference to FIG. 6.

Figure 7:
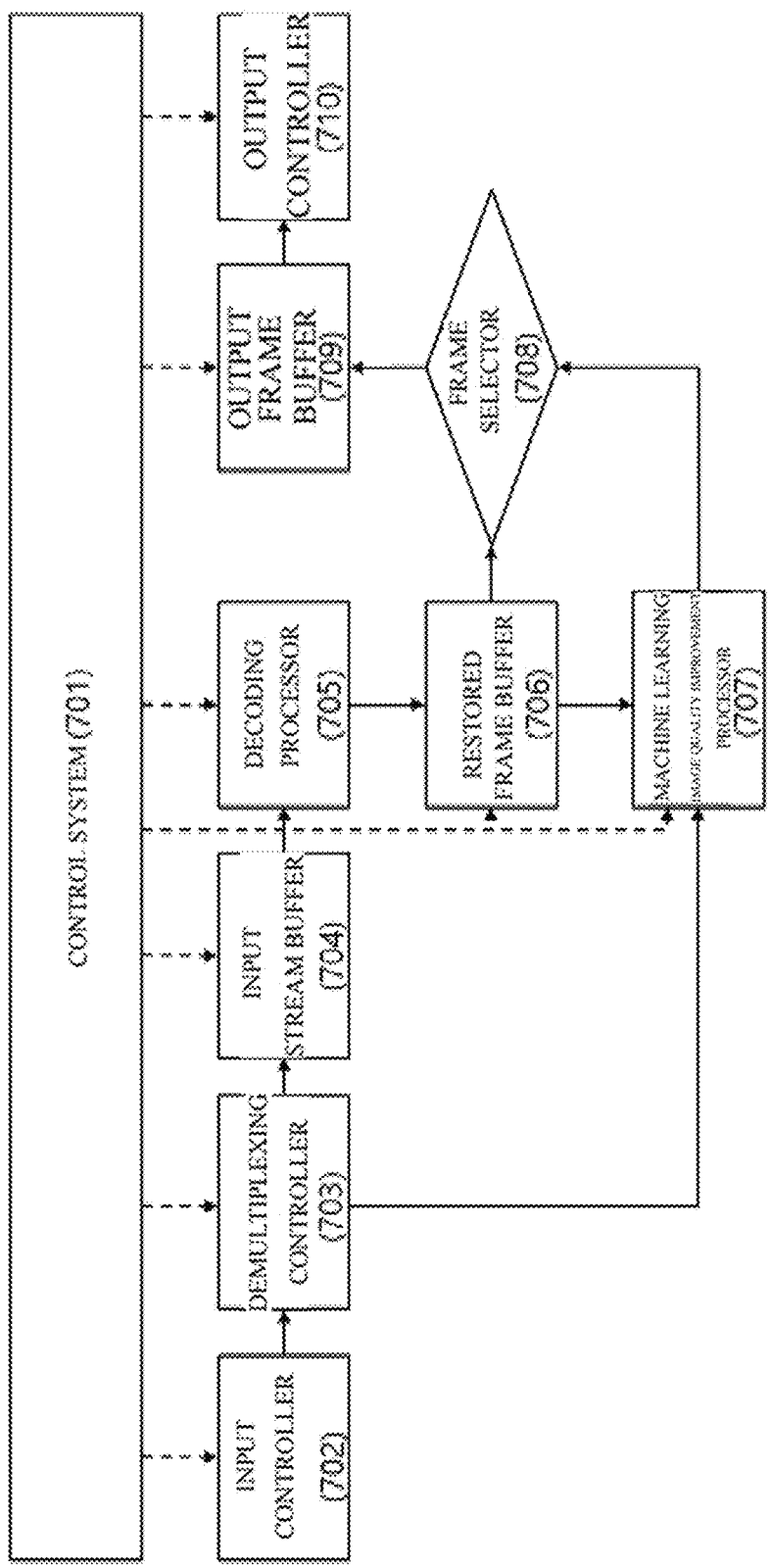
FIG. 7 is a block diagram illustrating a decoding system in an image processing apparatus according to another embodiment.

FIG. 7 is a diagram illustrating a decoding system in an image processing apparatus 700 according to another embodiment.

The image processing apparatus 700 according to an embodiment further includes a frame selector 708 in addition to the image processing apparatus 600. That is, an input controller 702, a demultiplexing processor 703, an input stream buffer 704, a decoding processor 705, a restored frame buffer 706, a machine learning image quality improvement processor 707, an output frame buffer 709, and an output controller 710, which operate under the control of a control system 701, operate in the same manner as their counterparts of FIG. 6.

However, the frame selector 708 may compare a restored frame recorded in the restored frame buffer 706 with an output frame of the machine learning image quality improvement processor 707, select one of the frames, and output the selected frame.

That is, the frame selector 708 may select one frame by comparing the generated restored frame with the output frame obtained by performing an image quality improvement process on the reconstructed frame, and store the selected frame in the output frame buffer.

Figure 8:
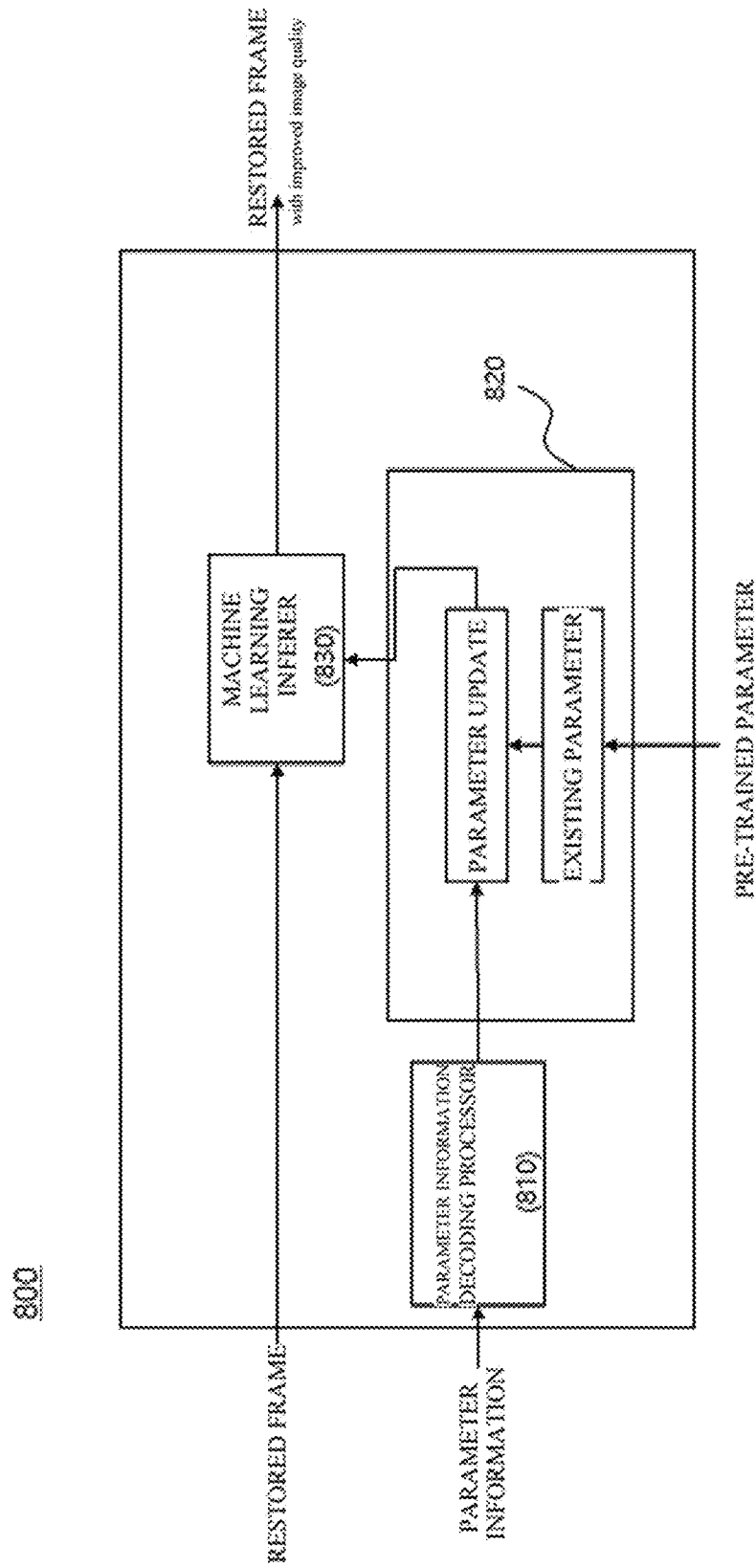
FIG. 8 is a detailed block diagram illustrating a machine learning image quality improvement processor according to an embodiment.

FIG. 8 is a detailed block diagram illustrating the machine learning image quality improvement processor 800 according to an embodiment.

The machine learning image quality improvement processor 800 according to an embodiment may output a restored frame with an improved image quality, for the input of a restored frame, parameter information, and a pre-trained parameter.

For this purpose, the machine learning image quality improvement processor 800 according to an embodiment may include a parameter information decoding processor 810, a parameter decider 820, and a machine learning inferer 830.

The parameter information decoding processor 810 may extract a parameter by decoding parameter information.

The parameter decider 820 may update the parameter in consideration of the difference between the extracted parameter and a pre-trained parameter.

The machine learning inferer 830 may improve the quality of the restored frame by applying the updated parameter to the restored frame stored in the restored frame buffer. In this process, the machine learning inferer 830 may improve the image quality of the restored frame while repeatedly performing inference and backpropagation.

Figure 9:
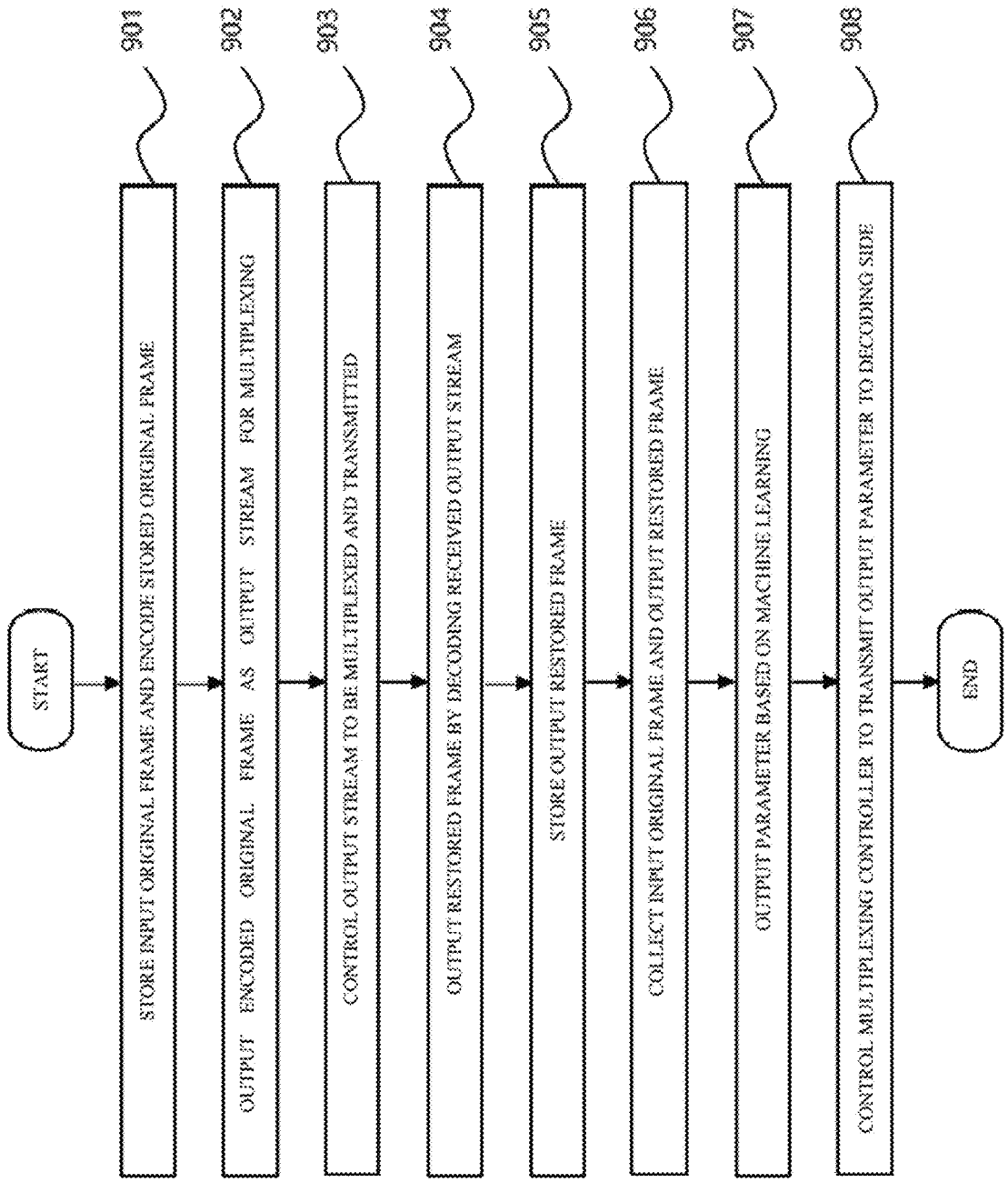
FIG. 9 is a flowchart illustrating an encoding operation in a method of operating an image processing apparatus according to an embodiment.

FIG. 9 is a diagram illustrating an encoding operation in a method of operating an image processing apparatus according to an embodiment.

In the method of operating an image processing apparatus according to an embodiment, an input original frame may be stored and encoded in step 901.

In the method of operating an image processing apparatus according to an embodiment, the encoded original frame may be output as an output stream for multiplexing in step 902, and the output stream may be multiplexed and transmitted in step 903.

In the method of operating an image processing apparatus according to an embodiment, a restored frame may be output by receiving and decoding the output stream in step 904, and the output restored frame may be stored in step 905.

In the method of operating an image processing apparatus according to an embodiment, the input original frame and the output restored frame may be collected in step 906, and a parameter may be output based on machine learning in step 907. In the method of operating an image processing apparatus, machine learning inference may be performed by initializing the output restored frame with a pre-trained parameter. Further, update of the pre-trained parameter may be requested by calculating an error by comparing the restored frame subjected to machine learning inference with the input original frame, and performing machine learning inference again by backpropagating the calculated error according to a predetermined criterion.

In the method of operating an image processing apparatus, the multiplexing processor may be controlled to transmit the output parameter to the decoding side in step 908.

In the method of operating an image processing apparatus according to an embodiment, to transmit the output parameter to the multiplexing module, the difference between the pre-trained parameter and the updated parameter may be encoded and transmitted to the multiplexing module.

Figure 10:
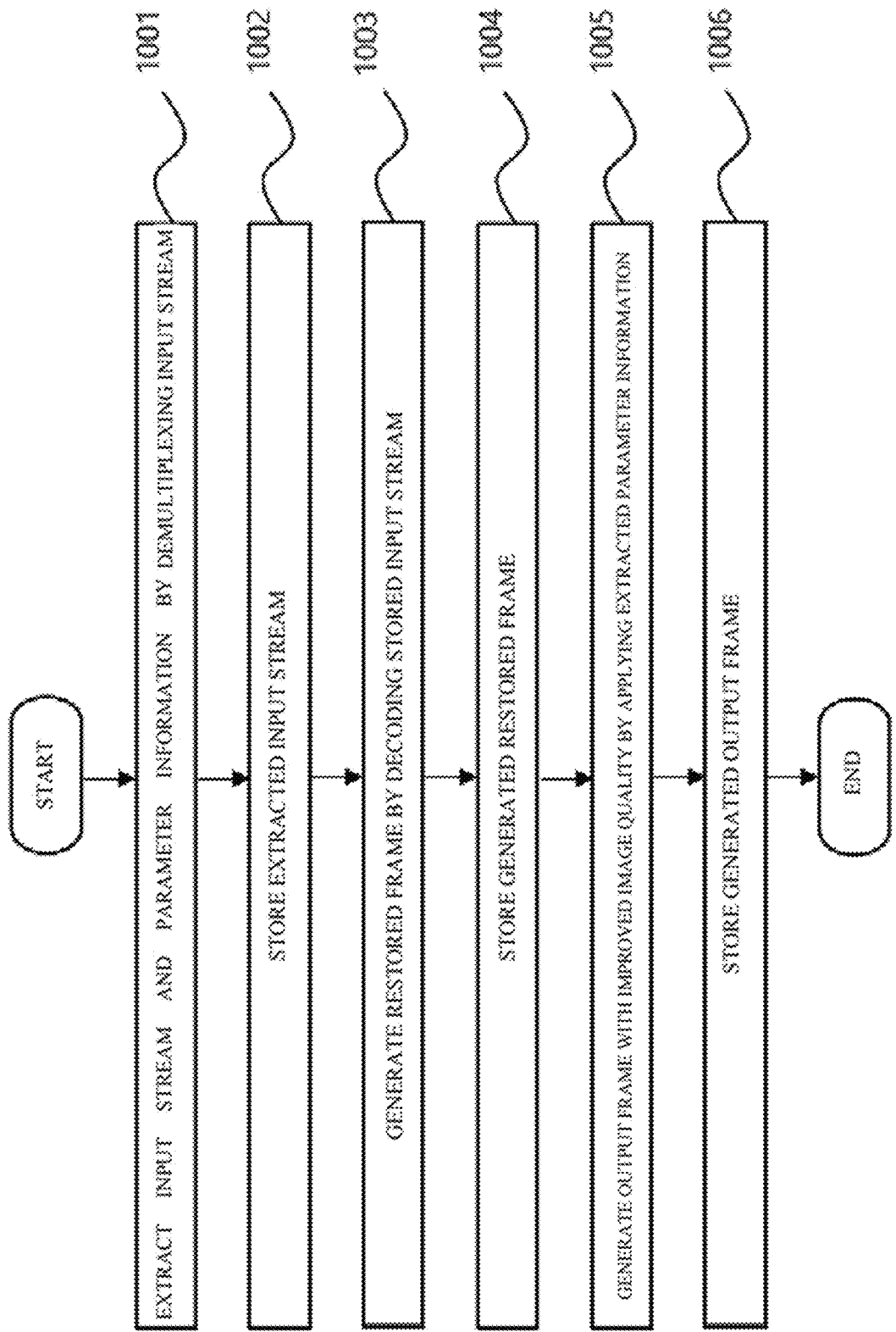
FIG. 10 is a flowchart illustrating a decoding operation in a method of operating an image processing apparatus according to an embodiment.

FIG. 10 is a diagram illustrating a decoding operation in a method of operating an image processing apparatus according to an embodiment.

In the method of operating an image processing apparatus according to an embodiment, an input stream received from an encoding device may be demultiplexed to extract the input stream and parameter information in step 1001.

In the method of operating an image processing apparatus according to an embodiment, the extracted input stream may be stored in step 1002, and decoded to generate a restored frame in step 1003. The generated restored frame may be stored in step 1004.

In the method of operating an image processing apparatus according to an embodiment, an output frame subjected to image quality improvement may be generated by applying the extracted parameter information to the restored frame. In the method of operating an image processing apparatus according to an exemplary embodiment, the generated output frame may be stored in the output frame buffer in step 1006.

The stored output frame may be output through a display device.

In conclusion, use of the present disclosure may compensate for the degradation of an image quality during encoding by using a parameter trained based on machine learning. Further, the parameter may be trained through machine learning during encoding and decoding.

The above-described apparatus may be implemented as a hardware component, a software component, and/or a combination of the hardware component and the software component. For example, apparatuses and components described in the embodiments may be implemented by one or more general-purpose computers or special-purpose computers including, for example, a processor, a controller, an arithmetic logic unit (ALU), a digital signal processor, a microcomputer, a field programmable array (FPA), a programmable logic unit (PLU), a microprocessor, or any other device capable of executing and responding to instructions. The processing device may execute an operating system (OS) and one or more software applications running on the OS. The processing device may also access, store, manipulate, process, and generate data in response to execution of the software. For convenience of understanding, although it has been described that one processing device is used, those skilled in the art will understand that the processing device includes a plurality of processing elements and/or a plurality of types of processing elements. For example, the processing device may include a plurality of processors or one processor and one controller. Other processing configurations are also possible, such as parallel processors.

Software may include a computer program, code, instructions, or a combination of one or more of them, which configures a processing device to operate as desired or independently or collectively command the device. Software and/or data may be embodied permanently or temporarily in any kind of machine, component, physical device, virtual equipment, computer storage medium or device, or transmission signal wave to be interpreted by the processing device or to provide instructions or data to the processing device. Software may be distributed over networked computer systems and stored or executed in a distributed manner. Software and data may be stored in one or more computer-readable recording media.

The method according to the embodiments may be implemented in the form of program instructions that can be executed through various computer means and recorded in a computer-readable medium. The computer-readable medium may include program instructions, data files, data structures, etc. alone or in combination. The program instructions recorded on the medium may be specially designed and configured for the embodiment, or may be known and available to those skilled in the art of computer software. Examples of the computer-readable recording medium include magnetic media such as hard disks, floppy disks, and magnetic tapes, optical media such as CD-ROMs and DVDs, and magneto-optical media such as floptical disk, and hardware devices specially configured to store and execute program instructions, such as ROM, RAM, flash memory, and the like. Examples of program instructions include not only machine language codes such as those generated by a compiler, but also premium language codes that can be executed by a computer using an interpreter or the like. The hardware devices described above may be configured to operate as one or more software modules to perform the operations of the embodiments, and vice versa.

While the embodiments have been described above with reference to the limited drawings, various modifications and variations can be made by those skilled in the art. For example, an appropriate result may be achieved by performing the described techniques in an order different from the described method, and/or combining the described components of the system, structure, apparatus, circuit, and so on in a different manner from in the described method or replacing them with other components or equivalents.

Therefore, other implementations, other embodiments, and equivalents to the claims also fall within the scope of the following claims.

The invention claimed is:

1. An image processing apparatus comprising:
an input frame buffer configured to store an input original frame;
an encoding processor configured to encode the stored original frame;
an output stream buffer configured to output the encoded original frame as an output stream for multiplexing;
a multiplexing processor configured to control the output stream to be multiplexed and transmitted;
a local decoding processor configured to output a restored stream by receiving the output stream from the output stream buffer and decoding the output stream;
a restored frame buffer configured to store the output restored stream; and
a machine learning processor configured to collect the input original frame and the restored frame decoded at the local decoding processor and stored at the restored frame buffer, output a parameter based on machine learning of the collected original frame and the collected restored frame, and control the multiplexing processor to transmit the output parameter to a decoding side.

2. The image processing apparatus according to claim 1, wherein the multiplexing processor processes the output parameter and the multiplexed output stream to be transmitted in association with each other to the decoding side.

3. The image processing apparatus according to claim 1, wherein the machine learning processor comprises:
a machine learning inferencing module configured to subject the output restored frame to machine learning inference by initializing the output restored stream with a pre-trained parameter;
an error backpropagation module configured to calculate an error value by comparing the restored frame subjected to machine learning inference with the input original frame, request the machine learning inferencing module to update the pre-trained parameter through machine learning inference again by backpropagating the calculated error value according to a predetermined criterion, and output the updated parameter; and
a parameter transmitter configured to transmit the output parameter to the multiplexing processor.

4. The image processing apparatus according to claim 3, wherein the parameter transmitter encodes a difference value between the pre-trained parameter and the updated and output parameter and transmits the encoded difference value to the multiplexing processor.

5. The image processing apparatus according to claim 3, wherein the machine learning processor further comprises a training sub-image divider configured to divide at least one of the restored frame or the original frame into a plurality of sub-images,
wherein the machine learning inferencing module subjects a plurality of sub-images divided from the restored frame to machine learning inference by initializing the plurality of sub-images divided from the restored frame with the pre-trained parameter, and the error backpropagation module calculates an error value by comparing a plurality of sub-images divided from the original frame with the plurality of sub-images divided from the restored frame.

6. The image processing apparatus according to claim 3, wherein the machine learning processor outputs a parameter based on the machine learning in which the machine learning processor updates only some layer block through a fine tuning process of updating only the layer block in an initialized state based on the pre-trained parameter without updating and outputting a whole parameter during the machine learning.

7. The image processing apparatus according to claim 1, further comprising:
a decoding processor configured to collect a restored frame from an output stream buffer at an adjacent different level and decoding the collected restored frame;
a restored frame buffer configured to store the decoded restored frame; and
a machine learning image quality improvement processor configured to generate filter parameters by machine learning of the stored restored frame and the restored frame of an adjacent level, and output the filter parameters.

8. The image processing apparatus according to claim 7, wherein the multiplexing processor multiplexes the filter parameters of the adjacent different levels.

9. The image processing apparatus according to claim 7, wherein the machine learning image quality improvement processor further collects the original frame, and generates and outputs a filter parameter by machine learning of the original frame, the stored restored frame, and the restored frame of the adjacent level.

10. The image processing apparatus according to claim 9, further comprising a resizing module configured to adjust the size of the original frame,
wherein the machine learning processor generates and outputs a filter parameter by machine learning of the original frame with the size adjusted by the resizing module, the stored restored frame, and the restored frame of the adjacent level.

11. An image processing apparatus comprising:
a demultiplexing processor configured to extract an input stream and parameter information by demultiplexing an input stream received from an encoding device;
an input stream buffer configured to store the extracted input stream;
a decoding processor configured to generate a restored frame by decoding the stored input stream;
a restored frame buffer configured to store the generated restored frame;
a machine learning image quality improvement processor configured to generate an output frame with an improved image quality by applying the extracted parameter information to the restored frame; and
an output frame buffer configured to store the generated output frame,
wherein the encoding device updates a parameter by machine learning based on an error between an input original frame and a restored frame restored from the original frame, the restored frame decoded at a local decoder and stored at the restored frame buffer, and transmits the parameter information corresponding to the updated parameter together with the input stream.

12. The image processing apparatus according to claim 11, wherein the parameter information is information about a difference between a pre-trained parameter and the updated parameter.

13. The image processing apparatus according to claim 11, further comprising a frame selection module configured to select one frame by comparing the generated restored frame with the output frame with the improved image quality for the restored frame, and control the selected frame to be stored in the output frame buffer.

14. The image processing apparatus according to claim 12,
wherein the machine learning image quality improvement processor comprises:
a parameter information decoding processor configured to extract a parameter by decoding the parameter information;
a parameter decision module configured to update the parameter in consideration of a difference between the extracted parameter and the pre-trained parameter; and
a machine learning inferencing module configured to improve an image quality of the restored frame by applying the updated parameter to the restored frame stored in the restored frame buffer.

15. An image processing apparatus comprising:
an input frame buffer configured to store an input original frame;
an encoding processor configured to encode the stored original frame;
an output stream buffer configured to output the encoded original frame as an output stream for multiplexing;
a multiplexing processor configured to control the output stream to be multiplexed and recorded on a storage medium;
a local decoding processor configured to output a restored stream by receiving the output stream from the output stream buffer and decoding the output stream;
a restored frame buffer configured to store the output restored stream; and
a machine learning processor configured to collect the input original frame and the restored frame decoded at the local decoding processor and stored at the restored frame buffer, output a parameter based on machine learning of the collected original frame and the collected restored frame, and control the multiplexing processor to transmit the output parameter to the storage medium,
wherein the storage medium extracts an input stream and parameter information by demultiplexing the input stream requested to be stored, generates a restored frame by decoding the extracted input stream, generates an output frame with an improved image quality by applying the extracted parameter information to the restored frame, and stores the generated output stream.

16. A method of operating an image processing apparatus, the method comprising:
storing an input original frame by an input frame buffer;
encoding the stored original frame by an encoding processor;
outputting the encoded original frame as an output stream for multiplexing by an output stream buffer;
controlling the output stream to be multiplexed and transmitted by a multiplexing processor;
outputting a restored stream by receiving the output stream from the output stream buffer and decoding the output stream by a local decoding processor;

storing the output restored stream by a restored frame buffer; and collecting the input original frame and the restored frame decoded at the local decoding processor and stored at the restored frame buffer, outputting a parameter based on machine learning of the collected original frame and the collected restored frame, and controlling the multiplexing processor to transmit the output parameter to a decoding side by a machine learning processor.

17. The method according to claim 16, wherein the controlling of the output stream to be multiplexed and transmitted comprises processing the output parameter and the multiplexed output stream to be transmitted in association with each other to the decoding side.

18. The method according to claim 16, wherein the controlling of the multiplexing processor to transmit the output parameter to a decoding side comprises:

subjecting the output restored frame to machine learning inference by initializing the output restored stream with a pre-trained parameter;

calculating an error value by comparing the restored frame subjected to machine learning inference with the input original frame;

requesting an update of the pre-trained parameter through machine learning inference again by backpropagating the calculated error value according to a predetermined criterion;

outputting the updated parameter; and transmitting the output parameter to the multiplexing processor.

19. The method according to claim 18, wherein the transmitting of the output parameter to the multiplexing processor comprises encoding a difference value between the pre-trained parameter and the updated and output parameter and transmitting the encoded difference value to the multiplexing processor.

20. A method of operating an image processing apparatus, the method comprising:

extracting an input stream and parameter information by demultiplexing an input stream received from an encoding device by a demultiplexing processor;

storing the extracted input stream by an input stream buffer;

generating a restored frame by decoding the stored input stream by a decoding processor;

storing the generated restored frame by a restored frame buffer;

generating an output frame with an improved image quality by applying the extracted parameter information to the restored frame by a machine learning image quality improvement processor; and storing the generated output frame by an output frame buffer, wherein the encoding device updates a parameter by machine learning based on an error between an input original frame and a restored frame restored from the original frame, the restored frame decoded at a local decoder and stored at the restored frame buffer, and transmits the parameter information corresponding to the updated parameter together with the input stream.

21. The method according to claim 20, further comprising:

selecting one frame by comparing the generated restored frame with the output frame with the improved image quality for the restored frame; and controlling the selected frame to be stored in the output frame buffer.

22. The method according to claim 21, wherein the generation of an output frame with an improved image quality comprises:

extracting a parameter by decoding the parameter information;

updating the parameter in consideration of a difference between the extracted parameter and a pre-trained parameter; and processing the restored frame to have the improved image quality by applying the updated parameter to the stored restored frame.

* * * * *